US008606170B2

(12) United States Patent
Ramo (10) Patent No.: US 8,606,170 B2
(45) Date of Patent: Dec. 10, 2013

(54) METHOD AND APPARATUS FOR INTERACTIVE, COMPUTER-BASED, AUTOMATICALLY ADAPTABLE LEARNING

(75) Inventor: Simon Ramo, Santa Monica, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 306 days.

(21) Appl. No.: 13/354,722

(22) Filed: Jan. 20, 2012

(65) Prior Publication Data

US 2013/0189667 A1 Jul. 25, 2013

(51) Int. Cl.
*G09B 7/00* (2006.01)

(52) U.S. Cl.
USPC .......................................... 434/362

(58) Field of Classification Search
USPC .................................. 434/350, 362
See application file for complete search history.

(56) References Cited

U.S. PATENT DOCUMENTS

| 3,245,157 | A | 4/1966 | Laviana |
| 3,273,260 | A | 9/1966 | Walker |
| 3,461,571 | A | 8/1969 | Luxton |
| 3,789,136 | A | 1/1974 | Haith et al. |
| 4,052,798 | A | 10/1977 | Tomita et al. |
| 5,002,491 | A | 3/1991 | Abrahamson et al. |
| 5,267,865 | A | 12/1993 | Lee |
| 5,344,326 | A | 9/1994 | Ferris |
| 5,788,508 | A | 8/1998 | Lee |
| 5,823,788 | A | 10/1998 | Lemelson et al. |
| 5,842,871 | A | 12/1998 | Cutler et al. |
| 6,334,779 | B1 * | 1/2002 | Siefert ............ 434/322 |
| 6,336,813 | B1 | 1/2002 | Siefert |
| 6,386,883 | B2 | 5/2002 | Siefert |
| 6,411,796 | B1 | 6/2002 | Remschel |
| 6,470,170 | B1 | 10/2002 | Chen et al. |
| 6,554,618 | B1 | 4/2003 | Lockwood |

(Continued)

FOREIGN PATENT DOCUMENTS

| CA | 2724054 | 12/2009 |
| CN | 101465069 | 6/2009 |

(Continued)

OTHER PUBLICATIONS http://web.archive.org/web/20101112172245/http://en.wikipedia.org/wiki/Least_squares Nov. 2010.*

(Continued)

*Primary Examiner* — Robert J Utama
*Assistant Examiner* — Evan Page
(74) *Attorney, Agent, or Firm* — Carmen Patti Law Group, LLC (57) ABSTRACT

A method and apparatus interactive, computer-based, automatically adaptable education. The apparatus includes a screen visible to one or more students in a classroom and capable of accessing a network; a central computer capable of accessing the network and capable of transmitting a lesson over the network; and at least one educational module capable of accessing the network, the at least one educational module being assigned to a student, the at least one educational module being capable of receiving from the assigned student and transmitting to the central computer a response by the assigned student to the lesson, the central computer being capable of receiving the response, the central computer being further capable, based on the response, of interactively and automatically selecting and transmitting over the network for viewing on the screen, a new lesson.

6 Claims, 4 Drawing Sheets

(56) References Cited

U.S. PATENT DOCUMENTS

| | | | |
|---|---|---|---|
| 6,775,518 | B2 | 8/2004 | Norcott et al. |
| 6,885,844 | B2 * | 4/2005 | Roschelle et al. ............ 434/350 |
| 6,895,213 | B1 | 5/2005 | Ward |
| 6,915,104 | B2 | 7/2005 | Yonezu et al. |
| 6,978,115 | B2 | 12/2005 | Whitehurst et al. |
| 7,052,277 | B2 | 5/2006 | Kellman |
| 7,110,989 | B2 | 9/2006 | Iemoto et al. |
| RE39,435 | E | 12/2006 | Berman |
| 7,343,134 | B1 | 3/2008 | Ward |
| 7,715,780 | B1 | 5/2010 | Beamish et al. |
| 2001/0018178 | A1 | 8/2001 | Siefert |
| 2001/0055749 | A1 | 12/2001 | Siefert |
| 2002/0120593 | A1 | 8/2002 | Iemoto et al. |
| 2002/0132217 | A1 | 9/2002 | Yonezu et al. |
| 2004/0014017 | A1 | 1/2004 | Lo |
| 2006/0099563 | A1 | 5/2006 | Liu et al. |
| 2008/0311943 | A1 | 12/2008 | Earl |
| 2009/0029335 | A1 | 1/2009 | Gyaraki |
| 2009/0035733 | A1 | 2/2009 | Meitar et al. |
| 2010/0235854 | A1 | 9/2010 | Badgett |

FOREIGN PATENT DOCUMENTS

| | | |
|---|---|---|
| CN | 201255935 | 6/2009 |
| DE | 3416766 | 11/1985 |
| EP | 0399667 | 11/1990 |
| EP | 0526979 | 2/1993 |
| EP | 0578045 | 1/1994 |
| EP | 1739886 | 1/2007 |
| GR | 92100391 | 5/1994 |
| JP | 5113743 | 5/1993 |
| JP | 6075518 | 3/1994 |
| JP | 10282873 | 10/1998 |
| KR | 20010094726 | 11/2001 |
| KR | 20040057219 | 7/2004 |
| SG | 124313 | 8/2006 |

OTHER PUBLICATIONS http://web.archive.org/web/20101217011904/http://en.wikipedia.org/wiki/Mode_(statistics) Dec. 2010.*

Stephen Cooper et al; K-12 Computational Learning; Communications of the ACM; Nov. 2010; pp. 27-29; vol. 53, No. 11; DOI:10.1145/1839676.1839686.

John M. Peha; How K-12 Teachers are Using Computer Networks; Educational Leadership; Oct. 1995; pp. 18-25; vol. 53, EBSCO Publishing.

Priscilla Norton et al; On Its Way to K-12 Classrooms, Web 2.0 Goes to Graduate School; Computers in the School; 2008; pp. 163-180; vol. 25, No. 3/4; the Haworth Press; doi: 10.1080/07380560802368116.

Fethia A. Inan et al; Factors Affecting Technology Integration in K-12 Classrooms: a path model; Educational Technology Research and Development; Apr. 2010; pp. 137-154; vol. 58, No. 2; Published online Jul. 21, 2009; Association for Educational Communications and Technology 2009; doi 10.1007/s11423-009-9132-y.

Michal Barla et al; On the Impact of Adaptive Test Question Selection for Learning Efficiency; Computers and Education; Sep. 2010; pp. 846-857; vol. 55, No. 32; Elsevier Ltd; doi:10.1016/j.compedu.2010.03.016.

Guglielmo Trentin; Computerized Adaptive Tests and Formative Assessment; Journal of Educational Multimedia and Hypermedia; 1997; pp. 201-220; vol. 6, No. 2.

Yueh-Min Huang et al; An Adaptive Testing System for Supporting Versatile Educational Assessment; Computers and Education; Jan. 2009; pp. 53-67; vol. 52, No. 1; Elsevier; doi:10.1016/j.compedu.2008.06.007.

Philip Denton et al; Students' Response to Traditional and Computer-Assisted Formative Feedback: A Comparative Case Study; British Journal of Educational Technology; 2008; pp. 486-500; vol. 39, No. 3; Blackwell Publishing; USA; doi:10.1111/j.1467-8535.2007.00745.x.

Steven L. Wise et al; Response Time Effort: A New Measure of Examinee Motivation in Computer-Based Tests; Applied Measurement in Education; 2005; pp. 163-183; vol. 18, No. 2.

Donald T. Searls et al;. Computerized Indices for Evaluating Student Response Patterns; The Journal of Experimental Education; 1990; pp. 97-104; vol. 59.

Kathy Kenwright; Clickers in the Classroom; TechTrends; 2009; pp. 74-77; vol. 53, No. 1.

Samuel O. King et al; "Pretty Lights" and Maths! Increasing Student Engagement and Enhancing Learning through the Use of Electronic Voting Systems; Computers and Education; 2009; pp. 189-199; vol. 53, No. 9; Elsevier ; doi:10.1016/j.compedu.209.01012.

* cited by examiner

METHOD AND APPARATUS FOR INTERACTIVE, COMPUTER-BASED, AUTOMATICALLY ADAPTABLE LEARNING

BACKGROUND

The invention relates generally to computer-based learning and more particularly to a method and apparatus for interactive, computer-based, automatically adaptable learning.

Compared with other countries, primary (K-12) education in the United States seems to be performing at less than optimum levels. Some argue that if our educational system is not improved, our economy may be at risk of suffering in the future. Success in the increasingly competitive working world is becoming ever more dependent on a proper preparation through a good education.

SUMMARY

In one embodiment, there is provided an apparatus for interactive, computer-based, automatically adaptable education.

Another implementation of the apparatus encompasses a method for interactive, computer-based, automatically adaptable education.

In one embodiment, there is provided an apparatus for interactive, computer-based, automatically adaptable education, comprising: a screen visible to one or more students in a classroom and capable of accessing a network; a central computer capable of accessing the network and capable of transmitting a lesson over the network; and at least one educational module capable of accessing the network, the at least one educational module being assigned to a student, the at least one educational module being capable of receiving from the assigned student and transmitting to the central computer a response by the assigned student to the lesson, the central computer being capable of receiving the response, the central computer being further capable, based on the response, of interactively and automatically selecting and transmitting over the network for viewing on the screen, a new lesson.

In another embodiment, there is provided an apparatus for interactive, computer-based, automatically adaptable, comprising a screen visible to one or more students in a classroom and capable of accessing a network; a central computer capable of accessing the network and capable of transmitting a lesson over the network comprising at least one of instructions and a set of one or more test questions; at least one educational module capable of accessing the network, the at least one educational module being assigned to a student, wherein a different educational module is assigned to each student to whom an educational module is assigned, the at least one educational module being capable of receiving from the assigned student and transmitting to the central computer a response by the assigned student to the lesson; an audiovisual teaching tool comprising at least one of content and characters, wherein the audiovisual teaching tool is capable of helping to teach the lesson; and a text-based teaching tool comprising at least one of content comprised in the audiovisual teaching tool and characters comprised in the audiovisual teaching tool, wherein the text-based teaching tool is capable of helping to teach the lesson, the central computer being capable of receiving the response, the central computer being further capable, based on the response, of interactively and automatically selecting and transmitting over the network for viewing on the screen, a new lesson.

In another embodiment, there is provided a method for interactive, computer-based, automatically adaptable, comprising: providing a screen visible to one or more students in a classroom and capable of accessing a network; providing a central computer capable of accessing the network and capable of transmitting a lesson over the network; providing at least one educational module capable of accessing the network; allowing the at least one educational module to be assigned to a student; allowing the at least one educational modules to receive from the assigned student and to transmit to the central computer a response by the assigned student to a lesson; allowing the central computer to receive the response; and allowing the central computer, based on the response, to interactively and automatically select and transmit over the network for viewing on the screen, a new lesson.

In still another embodiment, there is provided a method for interactive, computer-based, automatically adaptable, comprising: providing a screen visible to one or more students in a classroom and capable of accessing a network; providing a central computer capable of accessing the network and capable of transmitting a lesson over the network comprising at least one of instructions and a set of one or more test questions; providing at least one educational module capable of accessing the network; allowing the at least one educational module to be assigned to a student, wherein a different educational module is assigned to each student to whom an educational module is assigned; providing an audiovisual teaching tool comprising at least one of content and characters, wherein the audiovisual teaching tool is capable of helping to teach the lesson; providing a text-based teaching tool comprising at least one of content comprised in the audiovisual teaching tool and characters comprised in the audiovisual teaching tool, wherein the text-based teaching tool is capable of helping to teach the lesson; allowing the at least one educational modules to receive from the assigned student and to transmit to the central computer a response by the assigned student to the lesson; allowing the central computer to receive the response; and allowing the central computer, based on the response, to interactively and automatically select and transmit over the network for viewing on the screen, a new lesson.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

As computers have become more and more ever present in modern society, computer-based learning systems have become indispensable.

The apparatus for interactive, computer-based, automatically adaptable education includes a plurality of components such as one or more of electronic components, hardware components, and computer software components. A number of such components can be combined or divided in the apparatus. An example component of the apparatus includes a set and/or series of computer instructions written in or implemented with any of a number of programming languages, as will be appreciated by those skilled in the art.

The apparatus in one example employs one or more computer-readable signal-bearing media. The computer-readable signal bearing media store software, firmware and/or assembly language for performing one or more portions of one or more implementations of the invention. The computer-readable signal-bearing medium for the apparatus in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Figure 1:
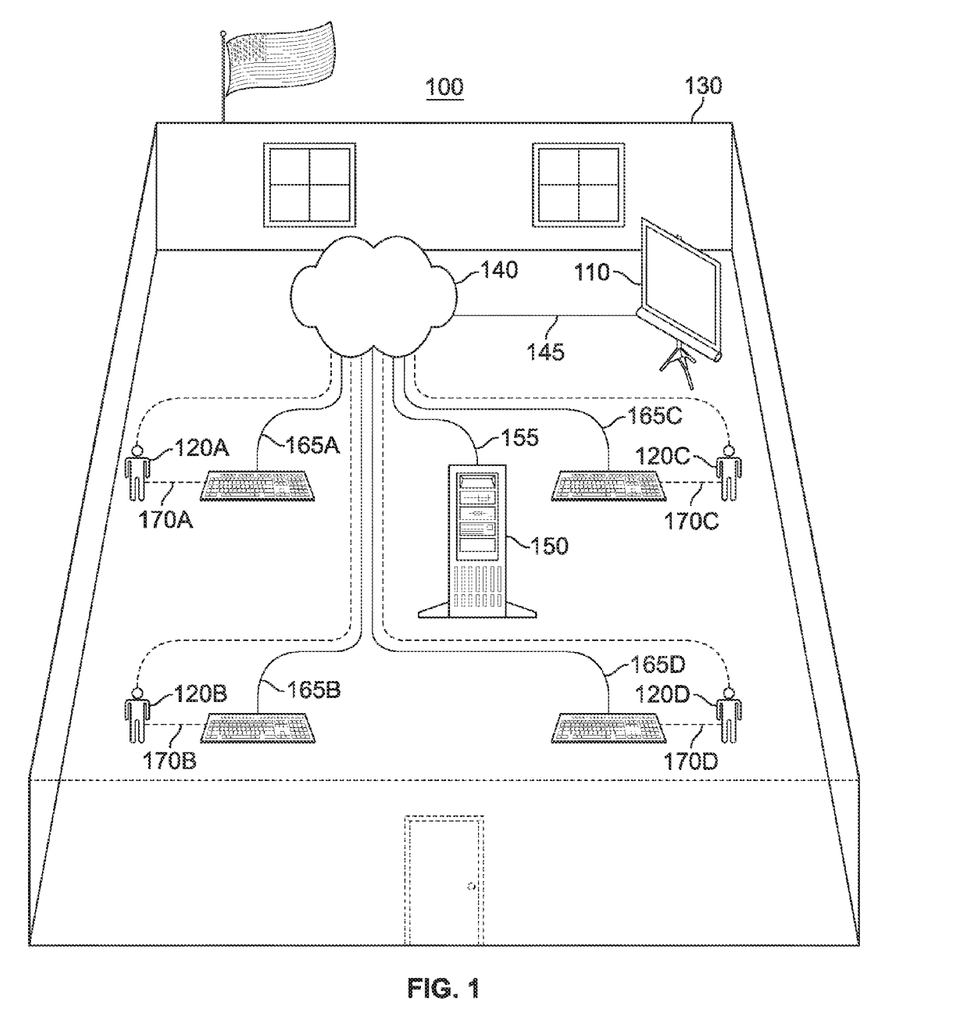
FIG. 1 is a drawing of an apparatus for interactive, computer-based, automatically adaptable education.

FIG. 1 is a drawing of an apparatus for interactive, computer-based, automatically adaptable education.

In FIG. 1, the apparatus 100 includes a screen 110. The screen 110 is visible to one or more students 120A-120D in a classroom 130. The screen 110 is capable of accessing a network 140 via a screen connection 145. The network 140 may be a wireless network 140, a local access network 140, a wired network 140, or another type of network 140. Preferably, the network 140 is a wireless network 140. Screen connection 145 may be a wired screen connection 145, may be a wireless screen connection 145, or may be another type of screen connection 145. Preferably, screen connection 145 is a wireless screen connection 145.

The apparatus 100 also includes a central computer 150. The central computer 150 is capable of accessing the network 140 via a central computer connection 155. Central computer connection 155 may be a wired central computer connection 155, may be a wireless central computer connection 155, or may be another type of central computer connection 155. Preferably, central computer connection 155 is a wireless central computer connection 155.

The central computer 150 may be a desktop computer 150, a notebook computer 150, a tablet computer 150, a cellular phone 150, or another type of computer 150. Preferably, the central computer 150 is a desktop computer 150. The central computer 150 may comprise one or more memories (not shown), one or more processors (not shown), and one or more modems or similar devices (not shown) to facilitate access by the central computer 150 to the network 140. As will be appreciated by those skilled in the art, the central computer 150 may further comprise any number of other possible electronic components, hardware components, and/or software components, in any of a virtually limitless number of possible configurations, without affecting the fundamental operation of embodiments of the invention.

The central computer 150 is capable of transmitting over the network 140 a lesson (not shown). Preferably, though not necessarily, the lesson comprises at least one of instruction and a set of one or more test questions.

The apparatus 100 also includes one or more educational modules 160A-160D. Educational modules 160A-160D may comprise one or more of a keyboard, a personal digital assistant (PDA), a cellular phone, an electronic book reader, a tablet computer, a desktop computer, a notebook computer, and other suitable devices for incorporation into an educational module 160A-160D. Preferably, an educational module 160A-160D may comprise a keyboard.

At least one of the educational modules 160A-160D is capable of accessing the network 140 via an educational module connection 165A-165D. The educational module connection 165A-165D may be a wired educational module connection 165A-165D, may be a wireless educational module connection 165A-165D, or may be another type of educational module connection 165A-165D. Preferably, educational module connection 165-165D is a wireless educational module connection 165A-165D.

At least one of the educational modules 160A-160D is assigned to a student 120A-120D. For example, educational module 160A may be assigned to student 120A. Preferably, though not necessarily, a different educational module 160A-160D is assigned to each student 120A-120D to whom an educational module 160A-160D is assigned.

At least one of the educational modules 160A-160D is capable of receiving from the assigned student 120A-120D over a corresponding student-educational module connection 170A-170D a response by the assigned student 120A-120D to the lesson. For example, educational module 160A may be capable of receiving from the assigned student 120A over student-educational module connection 170A a response by the assigned student 120A to the lesson. Student-educational module connection 170 can be a physical connection 170 or a network connection 170.

Alternatively, there may be no direct student-educational module connection 170A-170D, and the students 120A-120D may instead communicate indirectly with their respective assigned educational modules 160A-160D via network 140 and educational module connections 165A-165D. Alternatively, some students 120A-120D may communicate with their respective assigned educational modules 160A-160D via a student-educational module connection 170A-170D, while other students communicate indirectly with their respective assigned educational modulates 160A-160D via network 140 and educational module connections 165A-165D.

At least one of the educational modules 160A-160D is further capable of transmitting over the network 140 the response by the assigned student 120A-120D to the lesson. For example, educational module 160A may be capable of transmitting over the network 140 the response by the assigned student 120A to the lesson.

The central computer 150 is capable of receiving the response to the lesson by the assigned student 120A-120D. Moreover, the central computer 150 is capable, based on the response, of interactively and automatically selecting and transmitting a new lesson over the network 140. The new lesson can then be viewed on the screen 110 by one or more of the students 160A-160D. The apparatus thereby reduces the work required of the instructor, freeing up the instructor to devote his or her efforts to other tasks not susceptible to automation.

Optionally, automatically selecting the new lesson includes matching the new lesson to one or more of the responses.

Optionally, the central computer 150 is capable of automatically generating, from one or more of the responses, a group response describing the one or more responses.

Optionally, automatically selecting the new lesson includes matching the new lesson to the group response.

Optionally, the central computer 150 generates at least one of the test questions at intervals during the lesson. The intervals may be regular intervals or irregular intervals. Possible regular intervals include intervals of approximately five minutes.

Optionally, automatically selecting the new lesson includes automatically calculating the test scores achieved by the students on the one or more test questions.

Optionally, automatically selecting the new lesson includes selecting a previously completed lesson to be repeated when the calculated test scores are below a predetermined lower threshold.

Optionally, automatically selecting the new lesson includes selecting a previously completed lesson to be repeated when the calculated test scores are above a predetermined upper threshold.

Optionally, automatically calculating the test scores includes computing a representative number. For example, the representative number can comprise one or more of a least squares fit, a median, a mean, a mode, and another representative algorithm.

Optionally, automatically selecting the new lesson comprises using the calculated test scores to automatically adjust at least one of the content of the lesson and the speed of the lesson.

Optionally, the speed may be one of N speeds, where N is an integer.

Optionally, at least two of the speeds require different numbers of steps.

Optionally, at least one of the slower speeds comprises more steps than at least one of the higher speeds.

Optionally, the number of speeds N=3. Optionally, the speed may be one of a slow speed, a medium speed, and a fast speed. Optionally, the apparatus 100 starts at medium speed.

Optionally, the apparatus further includes software capable of controlling the operation of at least one of the screen 110, the central computer 150, and the at least one educational module 160A-160D.

Optionally, the lesson addresses one or more of reading, writing, geography, spelling, history, science, mathematics, health, and another primary school subject.

Optionally the one or more test questions comprise at least one multiple-choice question. Optionally, the one or more test questions comprise at least one true-false question. Optionally, the one or more test questions comprise at least one open-ended question.

Optionally, the central computer 150 is capable of referring an appropriate student based on the response to a separate environment for individualized learning.

Optionally, the referred student is a slow learner. Optionally, the referred student is a fast learned. Optionally, the separate environment is a physical room. Optionally, the separate environment is a virtual room.

Figure 2:
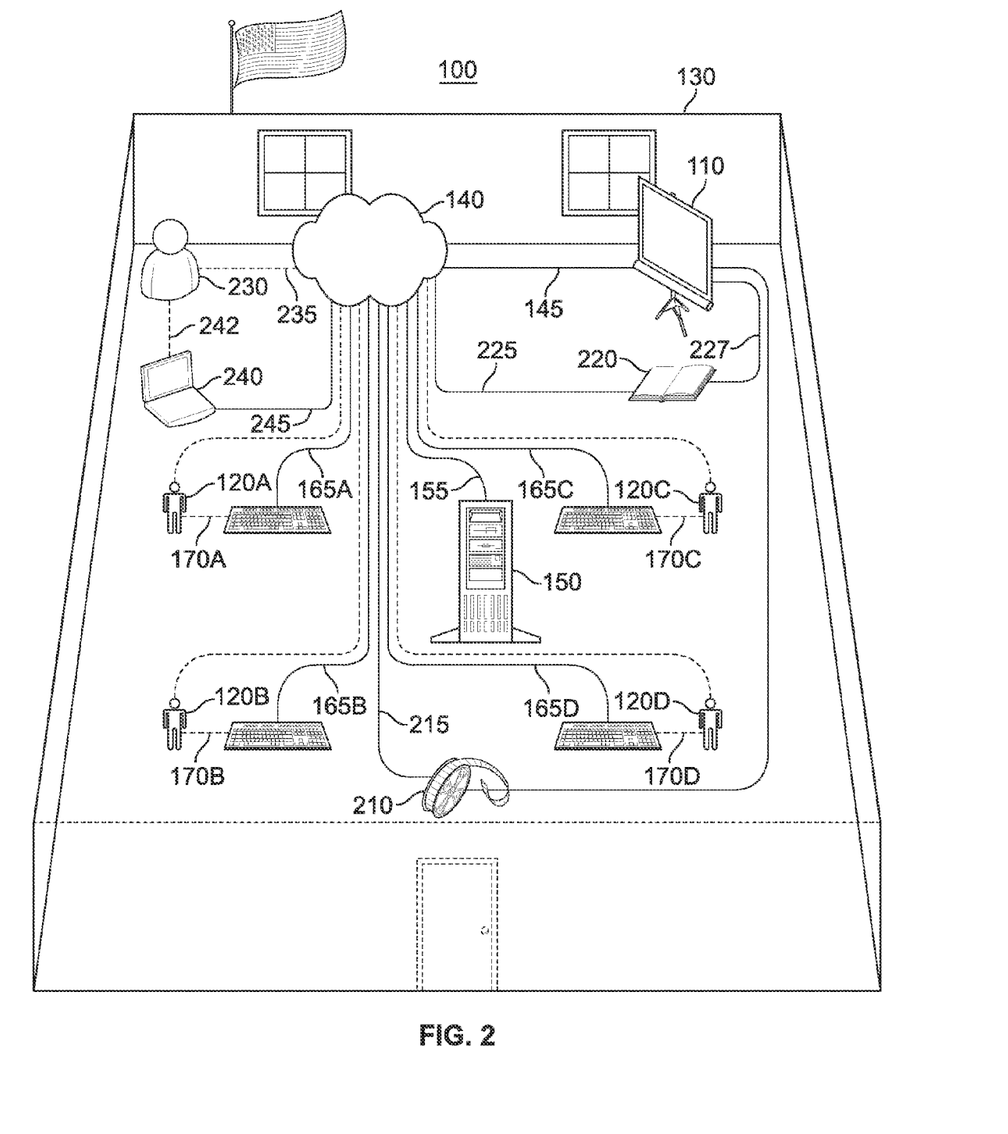
FIG. 2 is a drawing of an apparatus for interactive, computer-based, automatically adaptable education including an audiovisual teaching tool (in this example, a film) and a text-based teaching tool (in this example, a book).

FIG. 2 is a drawing of an apparatus for interactive, computer-based, automatically adaptable education including an audiovisual teaching tool (in this example, a film) and a text-based teaching tool (in this example, a book).

In FIG. 2, the apparatus 100 again includes a screen 110. As above, the screen 110 is visible to one or more students 120A-120D in a classroom 130. As before, the screen 110 is capable of accessing a network 140 via a screen connection 145.

The apparatus 100 again includes a central computer 150. The central computer 150 is capable of accessing the network 140 via a central computer connection 155.

The central computer 150 is again capable of transmitting over the network 140 a lesson (not shown). In this example, the lesson comprises at least one of instruction and a set of one or more test questions.

The apparatus 100 also includes one or more educational modules 160A-160D. Preferably, an educational module comprises a keyboard.

At least one of the educational modules 160A-160D is capable of accessing the network 140 via an educational module connection 165A-165D.

Again at least one of the educational modules 160A-160D is assigned to a student 120A-120D. For example, educational module 160A may be assigned to student 120A. In this example, a different educational module 160A-160D is assigned to each student 120A-120D to whom an educational module 160A-160D is assigned.

As above, alternatively, there may be no direct student-educational module connection 170A-170D, and the students 120A-120D may instead communicate indirectly with their respective assigned educational modules 160A-160D via network 140 and educational module connections 165A-165D. Again, alternatively, some students 120A-120D may communicate with their respective assigned educational modules 160A-160D via a student-educational module connection 170A-170D, while other students communicate indirectly with their respective assigned educational modulates 160A-160D via network 140 and educational module connections 165A-165D.

As above, at least one of the educational modules 160A-160D is capable of receiving from the assigned student 120A-120D over a corresponding student-educational module connection 170A-170D a response by the assigned student 120A-120D to the lesson. For example, educational module 160A may be capable of receiving from the assigned student 120A over student-educational module connection 170A a response by the assigned student 120A to the lesson. Student-educational module connection 170 can be a non-network connection 170 or a network connection 170.

At least one of the educational modules 160A-160D is further capable of transmitting over the network 140 the response by the assigned student 120A-120D to the lesson. For example, educational module 160A may be capable of transmitting over the network 140 the response by the assigned student 120A to the lesson.

The apparatus 100 further includes an audiovisual teaching tool 210. The audiovisual teaching tool 210 comprises at least one of content and characters. Preferably, though not necessarily, the audiovisual teaching tool 210 comprises a film. Preferably, though not necessarily, the audiovisual teaching tool 210 comprises an animated film. The audiovisual teaching tool 210 is capable of helping to teach the lesson.

Preferably, the audiovisual teaching tool 210 can be distributed over the network 140 with the central computer 150 using audiovisual connection 215. The audiovisual connection 215 can be a physical audiovisual connection 215 or a network audiovisual connection 215.

Alternatively, there may be no direct audiovisual connection 215, and the audiovisual teaching tool 210 may instead be distributed via a audiovisual screen connection 217 that connects the audiovisual teaching tool 210 directly with the screen 110. The audiovisual screen connection 217 can be a physical audiovisual screen connection 217 or a network audiovisual screen connection 217. In practice, the audiovisual screen connection 217 will often be made with the projector (not shown) that controls the screen 110.

The apparatus 100 further includes a text-based teaching tool 220. The text-based teaching tool 220 may comprise one or more of a book, an electronic book, and another type of text-based teaching tool. Preferably, though not necessarily, the text-based teaching tool 220 comprises a book. The text-based teaching tool 220 is capable of helping to teach the lesson.

Preferably, the text-based teaching tool 220 can be distributed over the network 140 with the central computer 150 using text-based connection 225. The text-based connection 225 can be a physical text-based connection 225 or a network text-based connection 225.

Alternatively, there may be no direct text-based connection 225, and the text-based teaching tool 220 may instead be distributed via a text-based screen connection 227 that connects the text-based teaching tool 220 directly with the screen 110. The text-based screen connection 227 can be a physical text-based screen connection 227 or a network text-based screen connection 227. In practice, the text-based screen connection 227 will often be made with the projector (not shown) that controls the screen 110.

In this example, the text-based teaching tool 220 includes at least one of content comprised in the audiovisual teaching tool 210 and characters comprised in the audiovisual teaching tool 210. Preferably, the text-based teaching tool comprises animated content.

As above, the central computer 150 is capable of receiving the response to the lesson by the assigned student 120A-120D. Moreover, the central computer 150 is capable, based on the response, of interactively and automatically selecting and transmitting a new lesson over the network 140. The new lesson can again then be viewed on the screen 110 by one or more of the students 160A-160D. As above, the apparatus thereby frees up the instructor to devote his or her efforts to other tasks not susceptible to automation.

Preferably, but not necessarily, the apparatus includes an instructor 230. Preferably, the instructor 230 can communicate over the network 140 with the central computer 150 using instructor connection 235. Preferably, the instructor can access an instructor's computer 240 through an instructor's computer connection 242. The instructor's computer 240 may comprise one or more of a PDA, a cellular phone, an electronic book reader, a tablet computer, a desktop computer, a notebook computer, and other suitable devices for incorporation into an instructor's computer 240. The instructor's computer connection 242 can be a physical instructor's computer connection 242 or a network instructor's computer connection 242. The instructor's computer 240 may be capable of receiving at least one of the response and the lesson.

Alternatively, there may be no direct instructor's computer connection 242, and the instructor 230 may instead communicate indirectly with the instructor's computer 240 via network 140 and instructor's computer connection 245.

Preferably, but not necessarily, an instructor 230 can communicate with one or more students 120A-120D over the network 140 via instructor's computer connection 245 using the instructor's computer 240.

Optionally, the response comprises one or more of an answer to one or more of the test questions and a request for at least one of a desired speed of the lesson and desired content of the lesson. Optionally, the central computer 150 is capable of automatically notifying the instructor 230 via the instructor's computer 240 of at least one of the desired speed and the desired content. This facilitates a seamless presentation by an instructor 230 with the benefit of real-time feedback to the instructor 230, without the interruption required by a show of hands or a poll of the audience.

Figure 3:
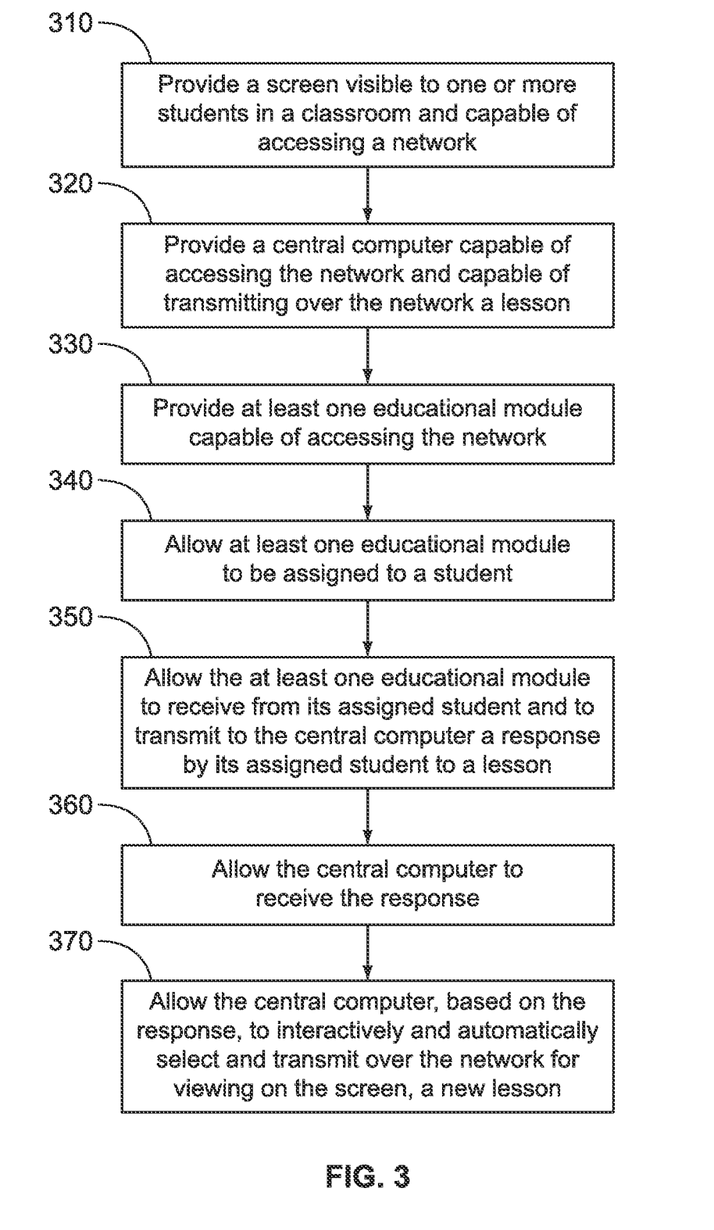
FIG. 3 is a flowchart of a method for interactive, computer-based, automatically adaptable education.

FIG. 3 is a flowchart of a representative embodiment of a method 300 for interactive, computer-based, automatically adaptable education. The order of the steps in the method 300 is not constrained to that shown in FIG. 3 or described in the following discussion. Several of the steps could occur in a different order without affecting the final result.

In block 310, a screen is provided that is visible to one or more students in a classroom and that is capable of accessing a network. Block 310 then transfers control to block 320.

In block 320, a central computer is provided that is capable of accessing the network and that is capable of transmitting a lesson over the network. Block 320 then transfers control to block 330.

In block 330, at least one education module is provided that is capable of accessing the network. Block 330 then transfers control to block 340.

In block 340, at least one educational module is allowed to be assigned to a student. Block 340 then transfers control to block 350.

In block 350, the at least one educational module is allowed to receive from the assigned student and to transmit to the central computer a response by the assigned student to a lesson. Block 350 then transfers control to block 360.

In block 360, the central computer is allowed to receive the response. Block 360 then transfers control to block 370.

In block 370, the central computer is allowed, based on the response, to interactively and automatically select and transmit over the network for viewing on the screen, a new lesson. Block 370 then terminates the process.

Optionally, the method further includes automatically notifying an instructor of the response.

Optionally, the method includes automatically notifying an instructor of at least one of the desired speed and the desired content.

Optionally, the method includes automatically generating, from one or more of the responses, a group response describing the one or more responses.

Optionally, the method includes generating at least one of the test questions at intervals during the lesson.

Optionally, the method further includes assigning each of the at least one educational module to a student.

Optionally, the method further includes assigning an instructor's computer to the instructor, wherein the instructor's computer is capable of receiving at least one of the response and the lesson.

Figure 4:
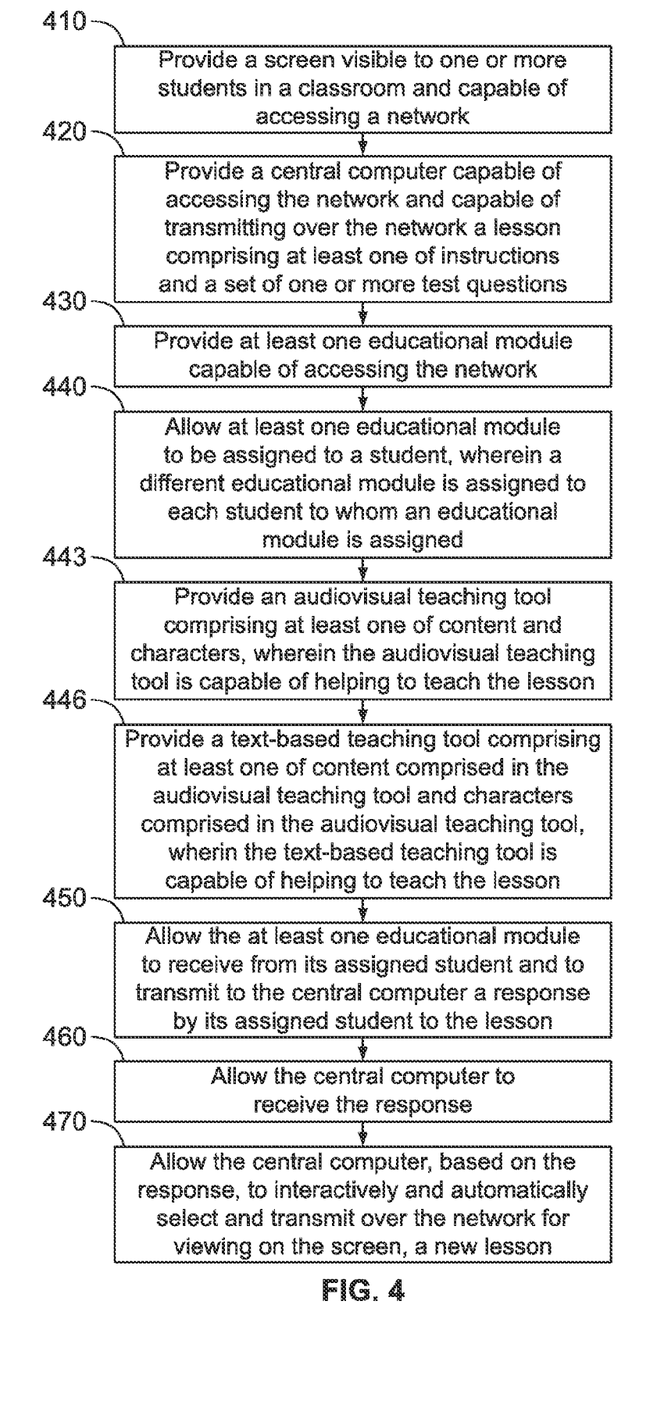
FIG. 4 is a flowchart of a method for interactive, computer-based, automatically adaptable education including providing an audiovisual teaching tool and providing a text-based teaching tool.

FIG. 4 is a flowchart of another representative embodiment of a method 400 for interactive, computer-based, automatically adaptable education including providing an audiovisual teaching tool and providing a text-based teaching tool. The order of the steps in the method 400 is not constrained to that shown in FIG. 4 or described in the following discussion. Several of the steps could occur in a different order without affecting the final result.

In block 410, a screen is provided that is visible to one or more students in a classroom and that is capable of accessing a network. Block 410 then transfers control to block 420.

In block 420, a central computer is provided that is capable of accessing the network and that is capable of transmitting a lesson over the network comprising at least one of instructions and a set of one or more test questions. Block 420 then transfers control to block 430.

In block 430, at least one education module is provided that is capable of accessing the network. Block 430 then transfers control to block 440.

In block 440, at least one educational module is allowed to be assigned to a student, wherein a different educational module is assigned to each student to whom an educational module is assigned. Block 440 then transfers control to block 443.

In block 443, an audiovisual teaching tool is provided comprising at least one of content and characters, wherein the audiovisual teaching tool is capable of helping to teach the lesson. Block 443 then transfers control to block 446.

In block 446, a text-based teaching tool is provided comprising at least one of content comprised in the audiovisual teaching tool and characters comprised in the audiovisual teaching tool, wherein the text-based teaching tool is capable of helping to teach the lesson. At least one education module is provided that is capable of accessing the network. Block 446 then transfers control to block 450.

In block 450, the at least one educational module is allowed to receive from the assigned student and to transmit to the central computer a response by the assigned student to a lesson. Block 450 then transfers control to block 460.

In block 460, the central computer is allowed to receive the response. Block 460 then transfers control to block 470.

In block 470, the central computer is allowed, based on the response, to interactively and automatically select and transmit over the network for viewing on the screen, a new lesson. Block 470 then terminates the process.

While the above representative embodiments have been described with certain components in exemplary configurations, it will be understood by one of ordinary skill in the art that other representative embodiments can be implemented using different configurations and/or different components. There may be many variations to these steps or components without departing from the spirit of the invention. For example, it will be understood by one of ordinary skill in the art that the order and connections of certain components can be altered without substantially impairing the functioning of the invention. The steps may be performed in a different order, or steps may be added, deleted, or modified. For example, the central computer 150 can communicate directly with the 160A-160D, rather than communicating over the network 140, without substantially impairing the functioning of the invention. As another example, the educational modules 160A-160D can collectively communicate with each other, transmitting to each other over the network 140 information on the responses of their respective assigned students 120A-120D, after which a selected educational module 120A-120D can transmit a collective response to the central computer 150, without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. An apparatus for interactive, computer-based, automatically adaptable education, comprising:
   a screen visible to one or more students in a classroom and capable of accessing a network;
   a central computer capable of accessing the network and capable of transmitting a lesson over the network;
   at least one educational module capable of accessing the network, the at least one educational module being assigned to a student, the at least one educational module being capable of receiving from the assigned student and transmitting to the central computer a response by the assigned student to the lesson,
   the central computer being capable of receiving the response, the central computer being further capable, based on the response, of interactively and automatically selecting and transmitting over the network for viewing on the screen, a new lesson, wherein the central computer is capable of referring an appropriate student based on the response to a separate environment for individualized learning, wherein the separate environment is a physical room; and
   an instructor's computer assigned to the instructor and capable of receiving at least one of the response and the lesson.

2. The apparatus as recited in claim 1, wherein the instructor's computer comprises a personal digital assistant (PDA).

3. The apparatus as recited in claim 1, wherein the instructor's computer comprises a cellular phone.

4. The apparatus as recited in claim 1, wherein the instructor's computer comprises an electronic book reader.

5. The apparatus as recited in claim 1, wherein the instructor's computer comprises a tablet computer.

6. A method for interactive, computer-based, automatically adaptable education, comprising:
   providing a screen visible to one or more students in a classroom and capable of accessing a network;
   providing a central computer capable of accessing the network and capable of transmitting a lesson over the network;
   providing at least one educational module capable of accessing the network;
   allowing the at least one educational module to be assigned to a student;
   allowing the at least one educational modules to receive from the assigned student and to transmit to the central computer a response by its assigned student to a lesson;
   allowing the central computer to receive the response; and
   allowing the central computer, based on the response, to interactively and automatically select and transmit over the network for viewing on the screen, a new lesson;
   allowing the central computer to refer an appropriate student based on the response to a separate environment for individualized learning, wherein the separate environment is a physical room; and
   assigning an instructor's computer to the instructor, wherein the instructor's computer is capable of receiving at least one of the response and the lesson.

* * * * *